United States Patent
Roy Thill et al.

(10) Patent No.: US 11,174,747 B2
(45) Date of Patent: Nov. 16, 2021

(54) SEAL ASSEMBLY WITH DISTRIBUTED COOLING ARRANGEMENT

(71) Applicant: United Technologies Corporation, Farmington, CT (US)

(72) Inventors: Carson A. Roy Thill, South Berwick, ME (US); Justin K. Bleil, Sandford, ME (US); Andrew D. Keene, Portland, ME (US); Jaime A. Arbona, West Palm Beach, FL (US); Danielle Mahoney, Dover, NH (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 71 days.

(21) Appl. No.: 16/819,519

(22) Filed: Mar. 16, 2020

(65) Prior Publication Data
US 2021/0254503 A1    Aug. 19, 2021

Related U.S. Application Data

(60) Provisional application No. 62/975,888, filed on Feb. 13, 2020.

(51) Int. Cl.
*F01D 25/24*    (2006.01)
*F01D 11/08*    (2006.01)
(Continued)

(52) U.S. Cl.
CPC .............. *F01D 11/08* (2013.01); *F01D 25/12* (2013.01); *F01D 25/246* (2013.01); *F01D 5/187* (2013.01);
(Continued)

(58) Field of Classification Search
CPC ........ F01D 25/12; F01D 11/08; F01D 25/246; F01D 25/24; F05D 2240/11; F05D 2230/64
See application file for complete search history.

(56) References Cited

U.S. PATENT DOCUMENTS 7,726,936 B2    6/2010  Keller et al.
7,874,795 B2    1/2011  Burdgick et al.
(Continued)

FOREIGN PATENT DOCUMENTS

EP           3176381         6/2017

*Primary Examiner* — Eldon T Brockman
(74) *Attorney, Agent, or Firm* — Carlson, Gaskey & Olds, P.C.

(57) ABSTRACT

An assembly for a gas turbine engine according to an example of the present disclosure includes, among other things, a seal arc segment that has a sealing portion and a pair of opposed rails extending outwardly from the sealing portion. The sealing portion includes a sealing face dimensioned to bound a core flow path and has a backside face opposed to the sealing face. The backside face includes a first localized region, a second localized region between the pair of rails, and a third localized region. A support includes a mounting portion and a first interface portion. At least one retention pin is dimensioned to engage the first interface portion of the support and at least one of the pair of rails such that the seal arc segment is carried by the at least one retention pin. A support plate is arranged relative to the support such that the at least one retention pin is trapped between the support plate and the support. A cooling cavity is established between the support, the support plate, and the second localized region. A method of sealing is also disclosed.

20 Claims, 8 Drawing Sheets

(51) Int. Cl.
*F01D 25/12* (2006.01)
*F01D 5/18* (2006.01)
*F01D 5/20* (2006.01)

(52) U.S. Cl.
CPC ............ *F01D 5/20* (2013.01); *F05D 2230/64* (2013.01); *F05D 2240/11* (2013.01); *F05D 2300/20* (2013.01)

(56) References Cited

U.S. PATENT DOCUMENTS

| | | |
|---|---|---|
| 8,328,505 B2 | 12/2012 | Shi et al. |
| 8,579,580 B2 | 11/2013 | Albers et al. |
| 8,753,073 B2 | 6/2014 | Albers et al. |
| 9,127,569 B2 | 9/2015 | Akiyama et al. |
| 9,518,474 B2 | 12/2016 | Shapiro et al. |
| 9,863,265 B2 | 1/2018 | Stapleton |
| 9,874,104 B2 * | 1/2018 | Shapiro ................. F01D 25/246 |
| 9,963,990 B2 | 5/2018 | Vetters et al. |
| 10,370,998 B2 | 8/2019 | Vetters et al. |
| 10,385,718 B2 | 8/2019 | O'Leary et al. |
| 11,021,988 B2 * | 6/2021 | Tableau ................. F01D 25/246 |
| 2016/0251982 A1 * | 9/2016 | Shapiro ................. F01D 25/246 |
| | | 415/134 |
| 2017/0016341 A1 | 1/2017 | Stapleton et al. |
| 2021/0131300 A1 * | 5/2021 | Arbona ................. F01D 11/005 |

\* cited by examiner

SEAL ASSEMBLY WITH DISTRIBUTED COOLING ARRANGEMENT

CROSS-REFERENCE TO RELATED APPLICATIONS

This application claims priority to U.S. Provisional Application 62/975,888, filed Feb. 13, 2020.

BACKGROUND

This disclosure relates to cooling of gas turbine engine components.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged about the blades. Cooling schemes may be utilized to cool the shroud.

SUMMARY

An assembly for a gas turbine engine according to an example of the present disclosure includes a seal arc segment that has a sealing portion and a pair of opposed rails extending outwardly from the sealing portion. The sealing portion includes a sealing face dimensioned to bound a core flow path and has a backside face opposed to the sealing face. The backside face includes a first localized region, a second localized region between the pair of rails, and a third localized region. A support includes a mounting portion and a first interface portion. The mounting portion is attachable to an engine static structure. At least one retention pin is dimensioned to engage the first interface portion of the support and at least one of the pair of rails such that the seal arc segment is carried by the at least one retention pin. A support plate is arranged relative to the support such that the at least one retention pin is trapped between the support plate and the support. A cooling cavity is established between the support, the support plate, and the second localized region. The support plate defines at least one cooling passage coupled to the cooling cavity. The at least one cooling passage extends along a first passage axis, and a projection of the first passage axis intersects the first localized region.

In a further embodiment of any of the foregoing embodiments, the seal arc segment comprises a ceramic material.

In a further embodiment of any of the foregoing embodiments, the support includes at least one feeding passage interconnecting the cooling cavity and a fluid source.

In a further embodiment of any of the foregoing embodiments, the at least one feeding passage extends along a second passage axis, and a projection of the second passage axis intersects the second localized region.

In a further embodiment of any of the foregoing embodiments, the at least one cooling passage is arranged such that cooling flow directly impinges on the first localized region in operation, and the at least one feeding passage is arranged such that cooling flow directly impinges on the second localized region in operation.

In a further embodiment of any of the foregoing embodiments, the seal arc segment is arranged about a longitudinal axis, and an exit port of the at least one cooling passage is radially inward of an exit port of the at least one feeding passage relative to the longitudinal axis.

In a further embodiment of any of the foregoing embodiments, the at least one cooling passage is dimensioned such that the first passage axis slopes inwardly in a direction away from the pair of rails relative to the longitudinal axis.

In a further embodiment of any of the foregoing embodiments, each of the pair of rails includes at least one interface bore dimensioned to receive the at least one retention pin such that the seal arc segment sits on an outer periphery of the at least one retention pin.

A further embodiment of any of the foregoing embodiments includes a seal member captured between the support plate and one of the pair of rails to bound the cooling cavity.

In a further embodiment of any of the foregoing embodiments, the support includes a second interface portion opposed to the first interface portion, the second interface portion is situated between the support plate and the first interface portion, and the at least one retention pin is dimensioned to span between the first and second interface portions.

In a further embodiment of any of the foregoing embodiments, the sealing portion and the pair of rails includes a ceramic material. The seal arc segment is arranged about a longitudinal axis. The sealing portion includes a leading edge portion, a trailing edge portion, and an intermediate portion between the leading and trailing edge portions relative to the longitudinal axis. The pair of rails includes a first rail and a second rail. The first and second rails extend circumferentially between opposed mate faces of the seal arc segment to divide the backside face into the first localized region along the leading edge portion. The second localized region is between the first and second rails and the third localized region. The support plate is releasably attached to the support. A seal member is captured between the support plate and the first rail. The first interface portion of the support is dimensioned to abut the second rail to bound the cooling cavity. The support includes at least one feeding passage interconnecting the cooling cavity and a fluid source. The at least one feeding passage extends along a second passage axis, a projection of the second passage axis intersects the second localized region, and an exit port of the at least one cooling passage is radially inward of an exit port of the at least one feeding passage relative to the longitudinal axis.

In a further embodiment of any of the foregoing embodiments, the first interface portion is free of any cooling passages coupled to the cooling cavity such that the third localized region is fluidly isolated from the cooling cavity.

A gas turbine engine according to an example of the present disclosure includes an engine case extending along an engine longitudinal axis, an array of blades rotatable about the engine longitudinal axis, and a seal assembly including an array of blade outer air seals (BOAS) arranged about the array of blades. Each of the BOAS have a sealing portion and a pair of rails extending outwardly from the sealing portion. The sealing portion has a leading edge portion, a trailing edge portion, and an intermediate portion between the pair of rails. At least one support is attached to the engine case. A plurality of retention pins are dimensioned to engage the at least one support and the pair of rails of a respective one of the BOAS such that the BOAS are carried by the retention pins. A support plate is positioned relative to the support such that the support plate limits movement of the plurality of retention pins relative to the engine longitudinal axis. A cooling cavity is established between the at least one support, the intermediate portion, and the support plate. The support plate defines at least one cooling passage coupled to the cooling cavity, and the at least one cooling passage is oriented to convey fluid from the cooling cavity in a direction towards the leading edge portion.

In a further embodiment of any of the foregoing embodiments, at least the sealing portion of each of the BOAS comprises a ceramic material.

In a further embodiment of any of the foregoing embodiments, the at least one support includes at least one feeding passage interconnecting the cooling cavity and a coolant source, the at least one feeding passage is arranged to eject cooling flow from the coolant source such that a portion of the cooling flow directly impinges on the intermediate portion in operation, and the support plate is arranged such that another portion of the cooling flow conveyed by the at least one cooling passage directly impinges on the leading edge portion in operation.

A further embodiment of any of the foregoing embodiments includes a seal member captured between the support plate and one of the pair of rails to bound the cooling cavity adjacent the leading edge portion.

A method of sealing for a gas turbine engine according to an example of the present disclosure includes positioning a seal arc segment relative to a support. The seal arc segment includes a sealing portion and a pair of opposed rails extending outwardly from the sealing portion. The sealing portion includes a sealing face dimensioned to bound a core flow path and includes a backside face opposed to the sealing face. The sealing portion includes a leading edge portion, a trailing edge portion, and an intermediate portion between the pair of rails. The support includes a mounting portion and a first interface portion. The mounting portion is attachable to an engine static structure. The method includes moving at least one retention pin into engagement with the first interface portion of the support and with at least one of the pair of rails such that the seal arc segment is carried by the at least one retention pin, trapping the at least one retention pin between the support and a support plate, and conveying cooling flow from at least one feeding passage to a cooling cavity. The cooling cavity is established between the support, the support plate and the backside face of the seal arc segment along the intermediate portion. The method includes conveying a portion of the cooling flow through at least one cooling passage extending through the support plate such that the portion of the cooling flow directly impinges on the leading edge portion of the seal arc segment and a localized temperature of the leading edge portion approaches a localized temperature of the intermediate portion.

In a further embodiment of any of the foregoing embodiments, the seal arc segment comprises a ceramic material.

In a further embodiment of any of the foregoing embodiments, the step of conveying the cooling flow from the at least one feeding passage occurs such that another portion of the cooling flow directly impinges on the intermediate portion of the seal arc segment and the localized temperature of the intermediate portion approaches a localized temperature of the trailing edge portion.

In a further embodiment of any of the foregoing embodiments, the conveying steps occur such that a first fluid pressure is established in the cooling cavity and such that a second fluid pressure is established between the support plate and the leading edge portion, the first fluid pressure being greater than the second fluid pressure.

The various features and advantages of this disclosure will become apparent to those skilled in the art from the following detailed description. The drawings that accompany the detailed description can be briefly described as follows.

DETAILED DESCRIPTION

Figure 1:
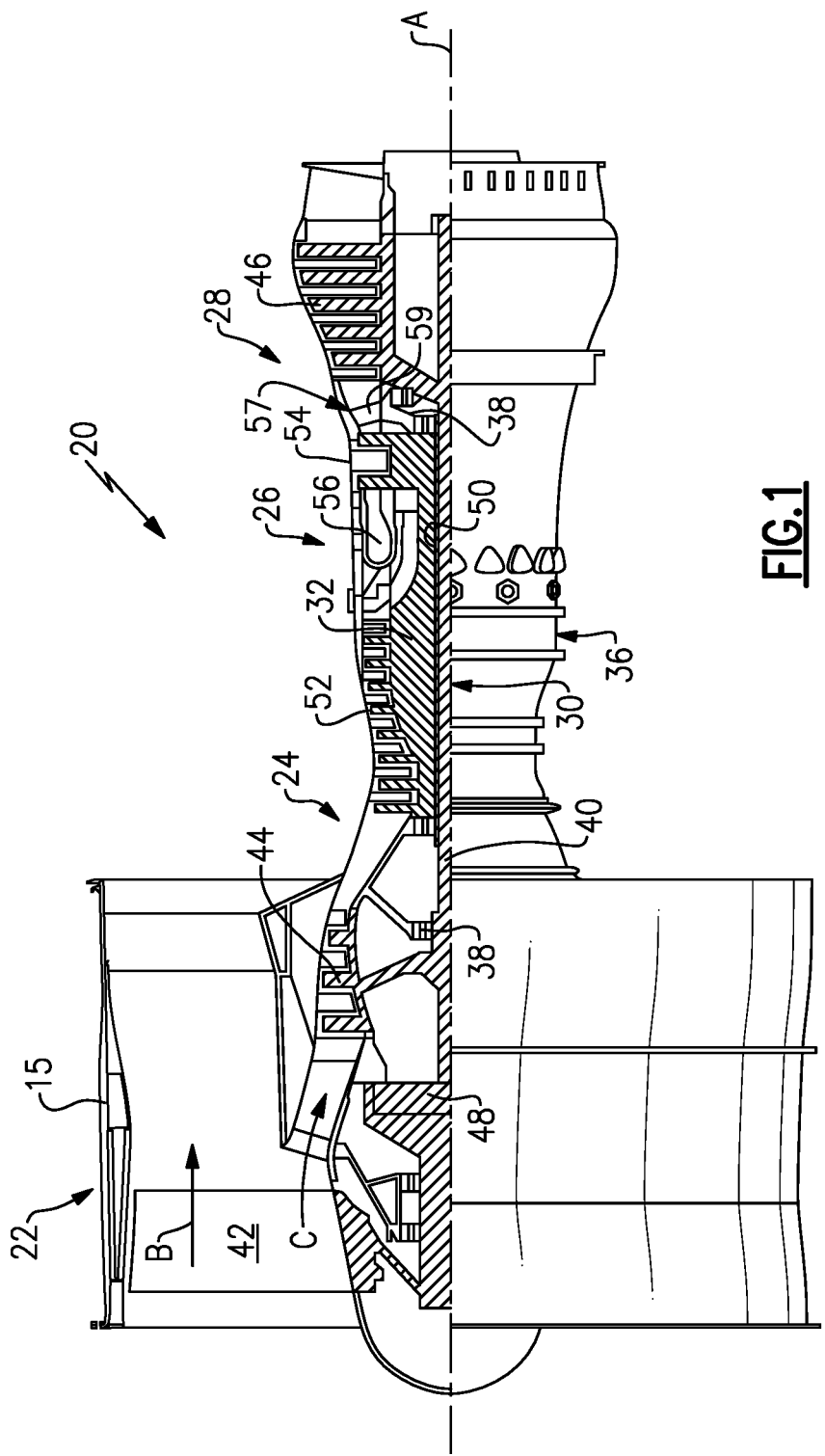
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \degree R)/(518.7\degree R)]^{0.5}$. The "Low corrected fan tip speed" as disclosed herein according to one non-limiting embodiment is less than about 1150 ft/second (350.5 meters/second).

Figure 2:
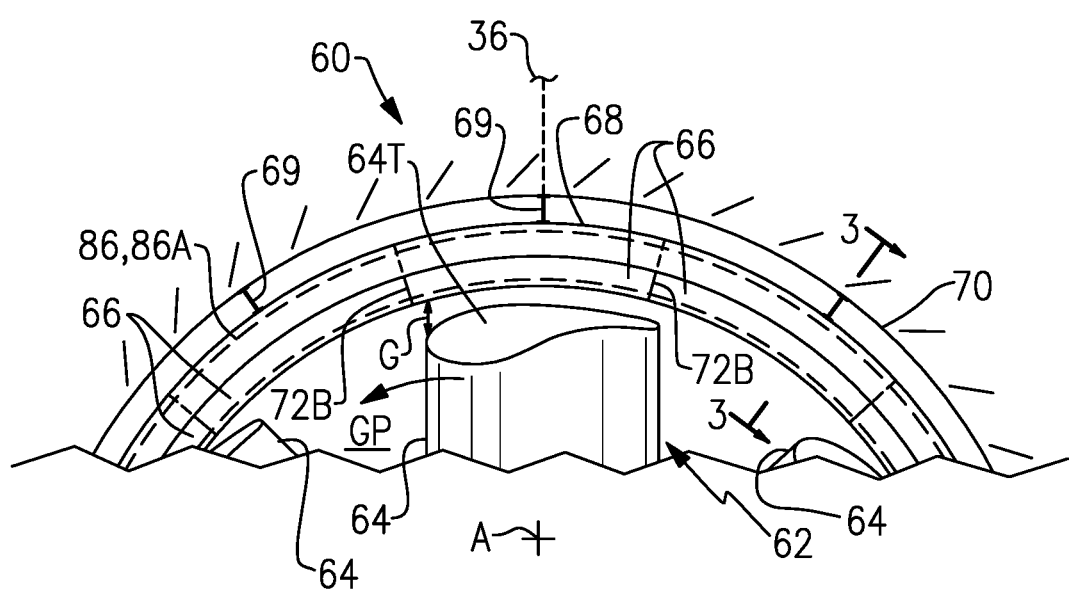
FIG. 2 illustrates an axial view of an example blade outer air seal assembly including a plurality of seal arc segments.

FIG. 2 illustrates an axial view of an example assembly 60 for a gas turbine engine. The assembly 60 can be incorporated into a portion of the engine 20 of FIG. 1, such as the turbine section 28. In the illustrative example of FIG. 2, the assembly 60 is a blade outer air seal assembly for sealing portions of a gas turbine engine. The assembly 60 can alternatively or additionally be adapted for other portions of the engine 20, such as an upstream stage of the compressor section 24 or combustor panels defining portions of a combustion chamber located in the combustor section 26. Although the teachings herein primarily refer to a two-spool gas turbine engine having a fan, other systems can benefit from the teachings herein, such as engines without a fan and other ground based systems.

The assembly 60 is positioned radially outward of a rotor 62 having an array (or row) of airfoils or rotatable blades 64. The blades 64 are rotatable about the engine longitudinal axis A in a gas path GP, such as the core flow path C (FIG. 1). The blades 64 are positioned adjacent to one or more rows of vanes that direct flow in the gas path GP towards the blades 64.

The assembly 60 includes one or more gas turbine engine components 66. In the illustrative example of FIG. 2, the components 66 are blade outer air seals (BOAS) or seal arc segments. The assembly 60 includes an array of seal arc segments 66 circumferentially arranged in an annulus around the engine longitudinal axis A and about the blades 64. The seal arc segments 66 are mounted to at least one support 68, which can be continuous or can be segmented as a plurality of supports (illustrated by dashed lines in FIG. 2). The support 68 is mounted or attached to an engine case 70 through one or more connections 69. The engine case 70 provides a portion of the engine static structure 36 (FIG. 1). The engine case 70 is arranged about and extends along the engine axis A. In other examples, the seal arc segments 66 are directly attached to the engine case 70. The engine case 70 can be mounted or attached to, or form a portion of, the engine static structure 36 (see also FIG. 1).

Each seal arc segment 66 can be formed of a material having a high temperature capability. Example high temperature materials include metallic alloys and ceramic-based materials, such as a monolithic ceramic or a ceramic matrix composite (CMC) material. An example of a high temperature metallic alloy is a nickel-based alloy. Monolithic ceramics include, but are not limited to, silicon carbide (SiC) or silicon nitride ($Si_3N_4$). In other examples, each seal arc segment 66 is formed of high-toughness material such as, but not limited to, single crystal metallic alloys.

The seal arc segments 66 are positioned in close radial proximity to tips 64T of the blades 64 to reduce the amount of gas flow that escapes around the blades 64 and through a clearance gap G. The engine 20 can include an active or passive clearance control system to adjust the clearance gap G to a desired dimension during one or more operating conditions of the engine 20. The clearance gap G may also vary during operation of the engine 20, such as between a non-operating, cold state condition, and an operating condition such as a cruise and/or takeoff condition of the engine 20.

Figure 3:
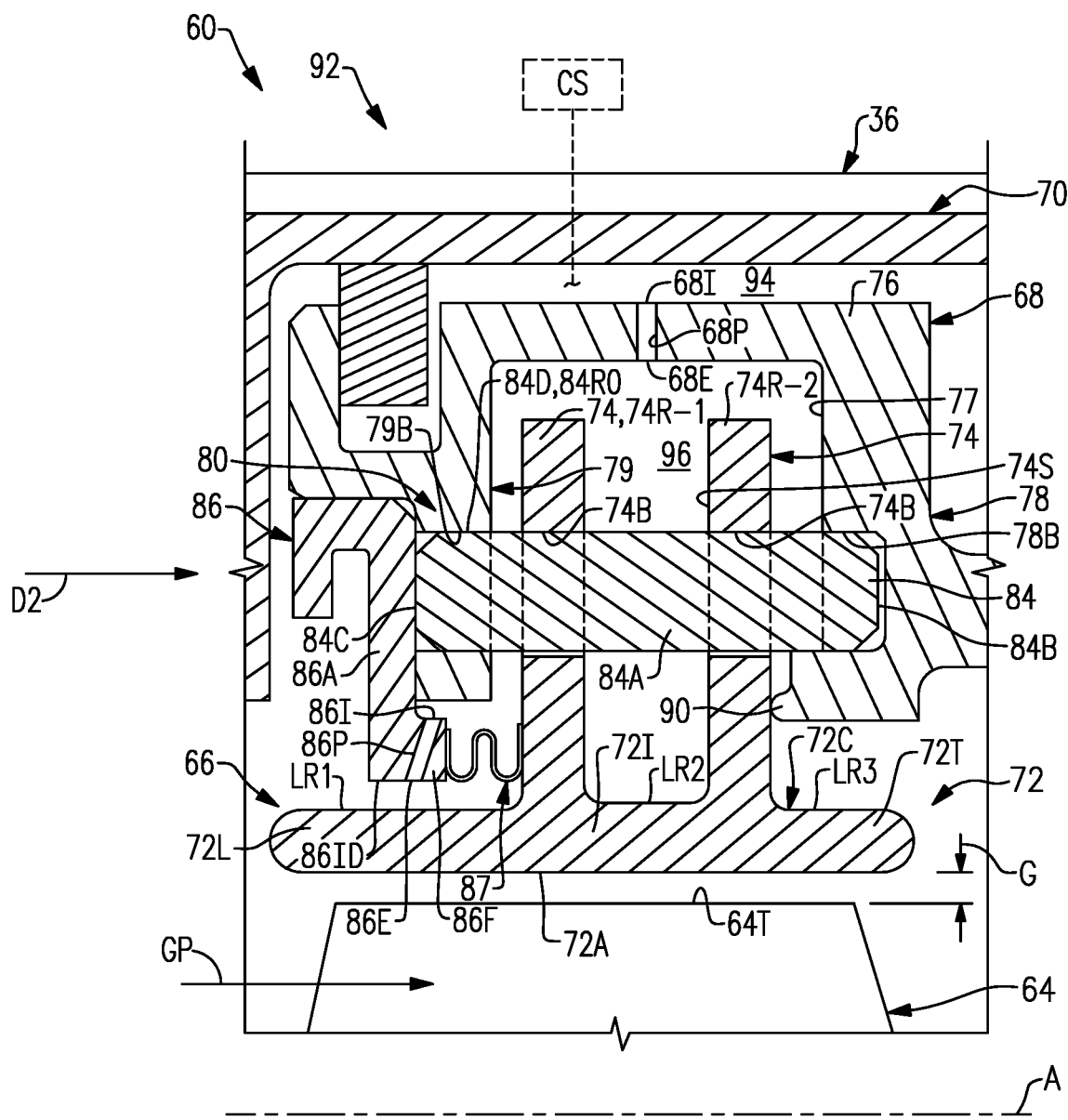
FIG. 3 illustrates a section view of the seal assembly taken along line 3-3 of FIG. 2 including a cooling scheme.

Referring to FIG. 3, with continuing reference to FIG. 2, an axial cross section view of the assembly 60 is shown. FIG. 4 illustrates a perspective view of an example seal arc segment 66. The seal arc segment 66 is arranged about the longitudinal axis A to bound the gas path GP. Each seal arc segment 66 includes a sealing portion 72 and a seal interface portion 74. The sealing portion 72 includes a generally arcuate sealing face (or surface) 72A extending between circumferential mate faces 72B, as illustrated by FIG. 4 (see also FIGS. 2 and 3A). The sealing face 72A is dimensioned to bound portions of the gas path GP, such as the core flow path C of FIG. 1.

The first interface portion 74 of the seal arc segment 66 includes a pair of opposed first and second rails 74R (indicated at 74R-1, 74R-2) extending radially outwardly from the sealing portion 72. An elongated slot or backside cavity 74S extends between the rails 74R. The seal arc segment 66, including at least the sealing portion 72 and/or rails 74R of the seal interface portion 74, can be made of any of the materials disclosed herein, including a ceramic-based material.

The sealing portion 72 of the seal arc segment 66 includes a backside face (or surface) 72C opposed to the sealing face 72A. The sealing portion 72 includes a leading edge (or first) portion 72L, a trailing edge (or second) portion 72T, and an intermediate (or third) portion 72I interconnecting the leading edge and trailing edge portions 72L, 72T. The intermediate portion 72I extends between the leading and trailing edge portions 72L, 72T relative to the longitudinal axis A. The backside face 72C includes a first (or leading edge) localized region LR1 along the leading edge portion 72L, a second (or intermediate) localized region LR2 between the pair of rails 74R, and a third (or trailing edge) localized region LR3 along the trailing edge portion 72T. The first and second rails 74R-1, 74R-2 are dimensioned to extend circumferentially between the opposed mate faces 72B of the seal arc segment 66 to divide the backside face 72C into the first localized region LR1, the second localized region LR2, and the third localized region LR3.

The support 68 includes a mounting portion 76, a first interface portion 78 and a second interface portion 79, which can be made of a metallic material. The mounting portion 76 is attachable to the engine static structure 36 directly or through the engine case 70. In the illustrative example of FIG. 3, the interface portions 78, 79 are flanges that extending radially inwardly from the mounting portion 76 in a direction towards the longitudinal axis A. The support 68 includes a support cavity 77 established between the interface portions 78, 79. The support cavity 77 is dimensioned to at least partially receive the rails 74R.

The assembly 60 includes a retention feature 80 that mounts the seal arc segments 66 to the support 68 during engine operation. The retention feature 80 is dimensioned to carry the seal arc segment 66 in an installed position. The retention feature 80 is dimensioned to establish and maintain a predetermined distance between the sealing face 72A of the seal arc segments 66 and the blade tips 64T across the clearance gap G.

Various retention features 80 can be utilized. The retention feature 80 can be arranged to releasably secure the seal interface portion 74 to the support 68. Example retention features include flanges, fasteners such as clips, pins, bolts and rivets, as well as other components that mechanically join objects together such as a length of wire. In the illustrative example of FIGS. 3-5, the retention feature 80 includes one or more retention pins (or members) 84 releasably secured to the seal arc segment(s) 66. Each retention pin 84 is dimensioned to engage the first and/or second interface portions 78, 79 of the support 68 and the rail(s) 74R of the seal interface portion 74 of a respective one of the seal arc segments 66 such that each of the seal arc segments 66 is carried by one or more of the retention pins 84 in the installed position. The seal arc segment 66, support 68 and retention pins 84 are separate and distinct components. In the illustrative example of FIG. 4, two retention pins 84 are utilized to mount each seal arc segment 66.

Each retention pin 84 includes an elongated main body 84A extending between opposed first and second end portions 84B, 84C. The retention pin 84 can be dimensioned to span between the first and second interface portions 78, 79, as illustrated in FIG. 3. The main body 84A of the retention pin 84 can have various geometries, such as a circular or otherwise elliptical cross sectional geometry. Other example geometries of the retention pin 84 can include triangular, rectangular and complex cross sectional geometries.

The seal interface portion 74 includes one or more interface bores 74B extending through a respective rail 74R. Each interface bore 74B of the rail 74R-1 is partially or completely radially aligned with a respective interface bore 74B of the rail 74R-2, as illustrated by FIG. 3. Each interface bore 74B can have a diameter that is greater than or equal to a diameter of a respective one of the retention pins 84. The interface bores 74B can be dimensioned to have a relatively greater diameter to accommodate differences in thermal expansion of the rails 74R, retention pins 84 and/or support 68 during engine operation. Utilizing the retention pins 84 to mounting the seal arc segments 66 may more evenly distribute loads and reduce localized stress concentrations in the rails 74R.

The first and second interface portions 78, 79 includes one or more respective support bores 78B, 79B (one of each shown in FIG. 3 for illustrative purposes). Each pair of interface and support bores 74B, 78B, 79B is dimensioned to at least partially receive a common retention pin 84 to establish the installed position of the seal arc segment 66.

In the installed position, each interface bore 74B is partially or completely radially aligned with an adjacent support bore 78B. Each retention pin 84 is slidably received in, and extends at least partially through, the support bore 79B and the interface bore 74B of each rail 74R-1, 74R-2 and is received in a respective support bore 78B to secure the interface portion 74 to the support 68 in the installed position. Each interface bore 74B is dimensioned such the rails 74R are carried by an outer periphery 84D of the retention pin(s) 84 in the installed position. The interface bores 74B of each rail 74R are dimensioned to receive a respective retention pin 84 such that the rails 74R of the seal arc segment 66 sit on an outer periphery or radially outer surface 84RO of the retention pin 84, as illustrated by FIG. 3.

The assembly 60 includes a support plate 86 releasably attached or otherwise secured to the support 68. Various techniques can be utilized to secure the support plate 86 to the support 68, such as one or more fasteners. The support plate 86 includes a plate body 86A having a generally arcuate geometry and extends about the engine longitudinal axis A. The support plate 86 can be a single component or can include one or more segments mechanically attached to each other. The support plate 86 includes a plate flange 86F extending outwardly from the plate body 86A. The plate flange 86F is dimensioned to extend along an inner diameter 86ID of the support plate 86. The support 68, support plate 86 and retention pins 84 can be made of a high temperature metal or metal alloy, for example.

The support plate 86 can be arranged or positioned relative to the support 68 such that the retention pin(s) 84 are trapped between the support plate 86 and support 68 in the installed position, as illustrated in FIG. 3. The first end portion 84B of the retention pin 84 is at least partially inserted into the respective support bore 78B, and the second end portion 84C of the retention pin 84 is dimensioned to abut against the plate body 86A of the support plate 86 such that the support plate 86 limits axial movement of the retention pin(s) 84 relative to the longitudinal axis A. Various techniques can be utilized to secure the retention pin 84 to the support 68, such as press fitting or threadedly attaching the retention pin 84 in the support bore 78B. The second interface portion 79 of the support 68 is axially opposed to the first interface portion 78 relative to the longitudinal axis A such that the second interface portion 79 is situated between the support plate 86 and the first interface portion 78.

The seal arc segments 66 can be subject to hot gases communicated at non-uniform temperatures across at different axial positions along the sealing face 72A as the hot gases are communicated downstream relative to a general direction of flow in the adjacent gas path GP. The temperature of the hot gases can vary in the axial direction relative to the general direction of flow in the gas path GP and/or relative to the longitudinal axis A. The seal arc segments can have varied thermal profiles due to these variations in temperature and convective coefficients on the gas path surface or sealing face 72A. Variations in temperature can create axial thermal gradients and thermal stresses within the seal arc segments. CMC-based seal arc segments may have relative lower stress margins and may have a much lower ductility than typical metal. Thermal stresses in the CMC components may cause delamination to occur. The techniques disclosed herein including the distributed cooling schemes can be utilized to provide target cooling augmentation to selected regions of the seal arc segments to uniformly cool or otherwise reduce variation in part temperature, localized hot spots and axial thermal gradients across the seal arc segment. A reduction of thermal gradients in the seal arc segments can reduce thermal stress concentrations and improve durability.

The assembly 60 establishes a distributed cooling arrangement or scheme 92 operable to cool the seal arc segment(s) 66 and adjacent portions of the assembly 60 during engine operation. Various cooling schemes 92 may be utilized, including any of the cooling schemes in combination with any of the assemblies disclosed herein.

The cooling scheme 92 includes at least one feeding plenum (or cavity) 94 and cooling cavity 96. The feeding plenum 94 can be defined by an engine static structure such as the engine case 70 or another portion of the engine static structure 36. In the illustrative example of FIG. 3, the plenum 94 is established between the engine case 70 and support 68. The plenum 94 is fluidly coupled to one or more coolant (or fluid) sources CS (one shown in dashed lines for illustrative purposes). The coolant source CS is configured to supply cooling air or fluid flow to the plenum 94. The plenum 94 is configured to receive pressurized cooling flow or fluid from the cooling source(s) CS to cool portions of the assembly 60 including the seal arc segment(s) 66, support 68 and/or engine case 70. Coolant sources CS can include bleed air from an upstream stage of the compressor section 24 (FIG. 1), bypass air, or a secondary cooling system aboard the aircraft, for example. The cooling cavity 96 can be established between the support 68, support plate 86, and the second localized region LR2 of the backside face 72C along the intermediate portion 72I of the seal arc segment 66, as illustrated by FIG. 3. The plenum 94 and cooling cavity 96 generally extend in a circumferential direction about the longitudinal axis A.

The assembly 60 can include a seal member 87 captured between the first rail 74R-1 of the seal arc segment 66 and the plate flange 86F of the support plate 86 to bound a perimeter of the cooling cavity 96 adjacent to the first localized region LR1 along the leading edge portion 72L. The seal member 87 is arranged to fluidly isolate the leading edge portion 72L from the cooling cavity 96. The seal member 87 can incorporate various seal configurations. In the illustrative example of FIG. 3, the seal member 87 is a W-seal arranged to oppose flow along an axial gap between the seal arc segment 66 and support plate 86.

The first interface portion 78 of the support 68 can be dimensioned to abut the second rail 74R-2 to bound a perimeter of the cooling cavity 96. In the illustrative example of FIG. 3, the support 68 includes at least one face seal 90 dimensioned to engage the interface portion 74 directly or along the second rail 74R-2. The face seal 90 is dimensioned to oppose fluid flow along an axial gap between the seal interface portion 74 and first interface portion 78 of the support 68. The face seal 90 is dimensioned to bound the cooling cavity 96 adjacent the third localized region LR3.

The cooling scheme 92 includes a dual impingement flow arrangement having at least one feeding passage 68P and at least one cooling passage 86P arranged to convey cooling flow between the coolant source CS and portions of the seal arc segment(s) 66. Each feeding passage 68P interconnects the cooling cavity 96 and the coolant source CS. In the illustrative example of FIG. 3, the support 68 defines one or more of the feeding passages 68P. Each feeding passage 68P extends along a respective passage axis 68PA (FIG. 5) between an inlet port 68I and an exit port 68E established along the cooling cavity 96. The feeding passage 68P conveys cooling flow to the backside cavity 74S to cool adjacent portions of the seal arc segment 66.

One or more cooling passages 86P are arranged at different positions than the feeding passages 68P to establish the distributed cooling arrangement or scheme 92. The support plate 86 defines one or more cooling passages 86P fluidly coupled to the cooling cavity 96. Each cooling passage 86P extends along a respective passage axis 86PA (FIG. 5) between an inlet port 86I and an exit port 86E. In the illustrative example of FIG. 3, the inlet port 86I is established along the cooling cavity 96. A diameter of the inlet and exit ports 68I/86I, 68E/86E can be the same or can differ to vary an amount of cooling flow CF communicated by the respective passages 68P, 86P.

Figure 3A:
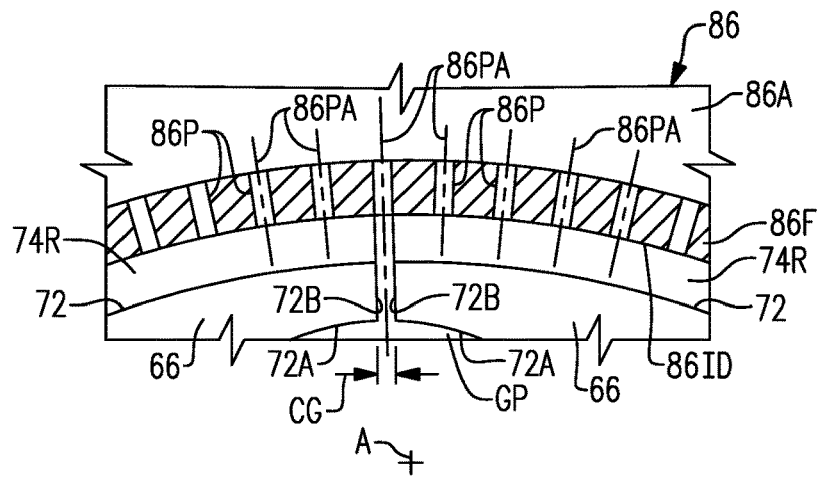
FIG. 3A illustrates an axial view of selected portions of the seal assembly of FIG. 3.
Figure 4:
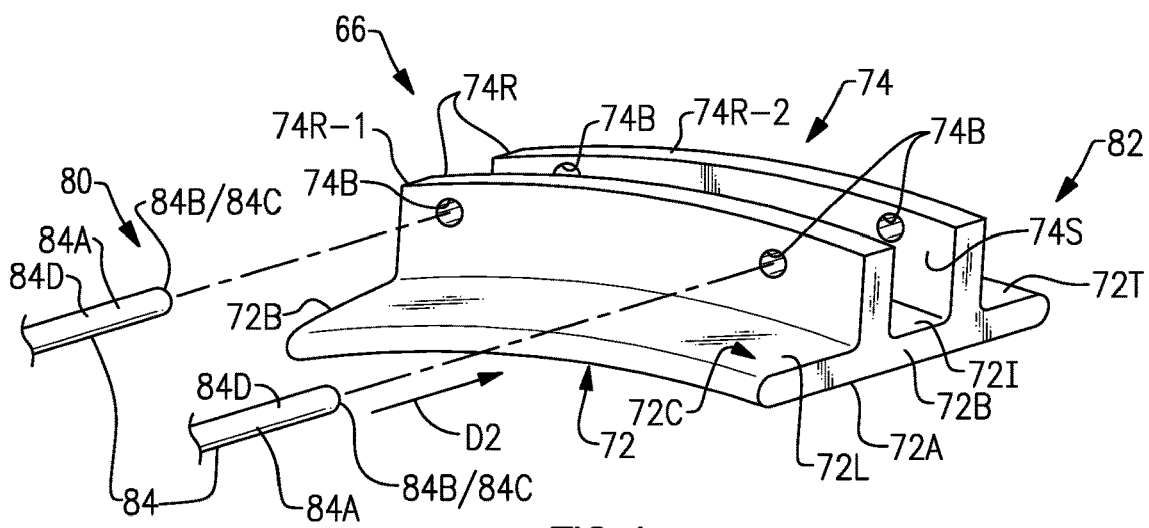
FIG. 4 illustrates a perspective view of the seal arc segment of FIG. 3.

In the illustrated example of FIG. 3A, the plate flange 86F has an arcuate geometry extending about the longitudinal axis A. The support plate 86 includes a plurality of cooling passages 86P circumferentially distributed about the longitudinal axis A. One or more of the passage axes 86PA can be circumferentially aligned with an intersegment gap CG established between the mate faces 72B of adjacent seal arc segments 66 to reduce or limit ingestion of hot gases from the gas path GP. The cooling passages 86P can be uniformly or non-uniformly distributed in the circumferential direction relative to the longitudinal axis A. For example, the cooling passages 86P can have a relatively greater concentration adjacent to the intersegment gap GP, as illustrated by FIG. 3A, which can be utilized to provide more uniform temperatures across the seal arc segments 66.

Figure 5:
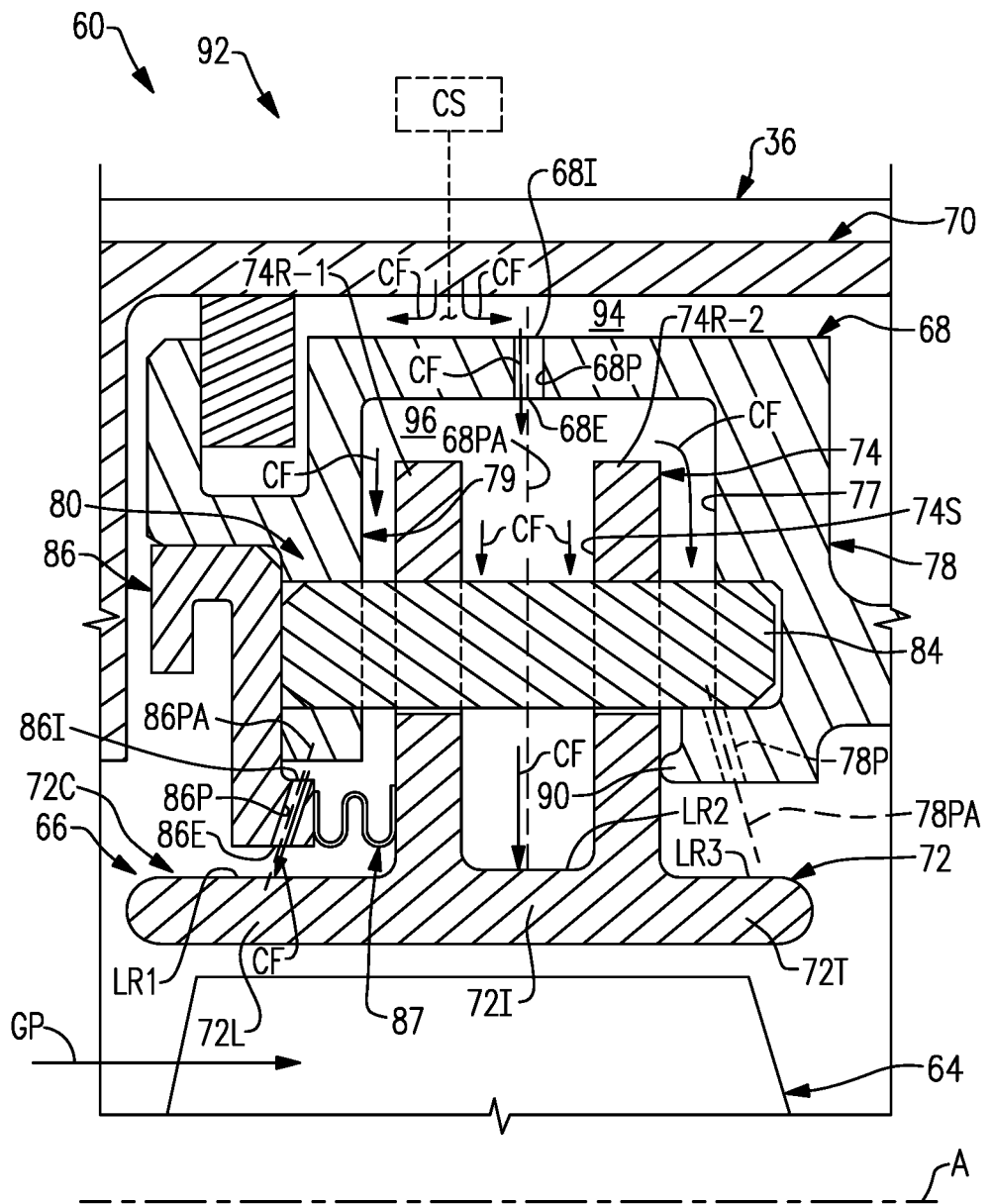
FIG. 5 illustrates the cooling scheme of FIG. 3.

Referring to FIG. 5, with continuing reference to FIGS. 2-3 and 3A, each feeding passage 68P and cooling passage 86P can be established at various orientations and/or positions to target portions of the localized regions LR1-LR3 of an adjacent seal arc segment 66. Each feeding passage 68P is arranged to convey a portion of the cooling flow CF to the cooling cavity 96. The feeding passage 68P can be arranged such that a portion of the cooling flow CF ejected from the exit port 68E diffuses or otherwise circulates in the cooling cavity 96. Each cooling passage 86P is oriented to convey cooling flow CF from the cooling cavity 96 in a direction towards the leading edge portion 72L, for example.

The feeding and/or cooling passages 68P, 86P can be arranged to provide impingement cooling to targeted or adjacent portions of the backside face 72C of the seal arc segments 66. The seal arc segments 66 can be arranged relative to the support 68 and support plate 86 such that the projections of the passage axes 68PA, 86PA of feeding passage 68P and/or cooling passage 86P have a major component extending in the radial direction. In the illustrative embodiment of FIG. 5, the feeding passage 68P is oriented such that a projection of the passage axis 68PA intersects the second localized region LR2, and the cooling passage 86P is oriented such that a projection of the passage axis 86PA intersects the first localized region LR1. The cooling passage 86P can be dimensioned such that the passage axis 86PA slopes inwardly in a direction away from the rails 74R relative to the longitudinal axis A, as illustrated in FIG. 5.

Each feeding passage 68P is arranged to eject cooling flow CF from the coolant source CS such that a portion of the cooling flow CF directly impinges on the second localized region LR2 along the intermediate portion 72I of the seal arc segment 66 in operation. Each cooling passage 86P is arranged such that another portion of the cooling flow CF conveyed by the cooling cavity 96 through the cooling passage 86P directly impinges on the first localized region LR1 along the leading edge portion 72L of the seal arc segment 66 in operation.

The feeding passage 68P and cooling passage 86P can be arranged at different radial positions relative to the longitudinal axis A such that an amount of localized cooling augmentation differs along the respective localized regions LR1, LR2. In the illustrative example of FIG. 3, the exit port 86E of the cooling passage 86P is radially inward of the exit port 68E of a circumferentially adjacent feeding passage 68P relative to the longitudinal axis A.

Figure 3B:
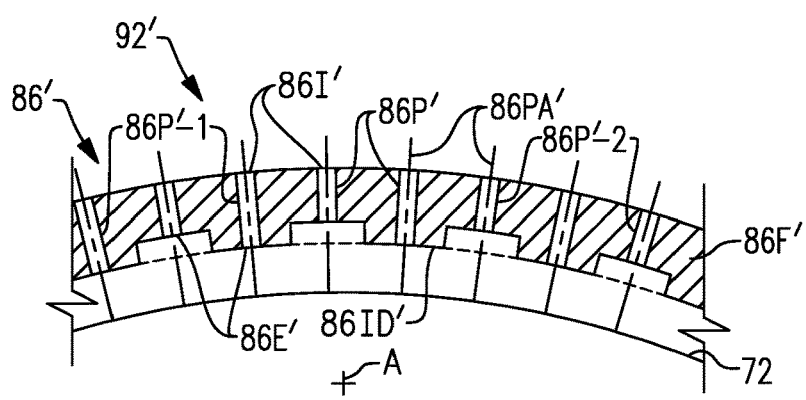
FIG. 3B illustrates a cooling scheme according to another example.

The cooling passages 86P can be arranged at the same or different radial positions relative to the longitudinal axis A. In the illustrative example of FIG. 3B, plate flange 86F' is castellated along inner diameter 86ID' of support plate 86'. First and second sets of cooling passages 86P-1', 86P-2' are circumferentially arranged such that the exit ports 86E' of the first set of cooling passages 86P-1' are radially inward of the exit ports 86E' of the second set of cooling passages 86P-2'. The radial positioning of sets of cooling passages 86P-1', 86P-2' can be utilized to reduce circumferential thermal gradients or hot spots that may otherwise occur due to non-uniform temperatures in the gas path GP (FIG. 3) caused by upstream vane arrangements, localized ingestion of hot gases in the intersegment gaps CG (FIG. 3A), or ingestion of airflow at non-uniform temperatures by the engine, for example.

The first interface portion 78 of the support 68 is free of any cooling passages coupled to the cooling cavity 96 such that the third localized region LR3 is fluidly isolated from the cooling cavity 96. In other examples, the first interface portion 78 includes at least one cooling passage 78P fluidly coupled to the cooling cavity 96 (shown in dashed lines in FIG. 5 for illustrative purposes). The cooling passage 78P extends along a passage axis 78PA and is oriented such that a projection of the passage axis 78PA intersects the third localized region LR3 and such that a portion of the cooling flow CF ejected from the cooling passage 78P directly impinges on the trailing edge portion 72T in operation. The cooling passage 78P can be dimensioned such that the passage axis 78PA slopes inwardly in a direction away from the rails 74R relative to the longitudinal axis A.

The assembly 60 can be assembled as follows. The interface portion 74 of each seal arc segment 66 is positioned relative to the first and second interface portions 78, 79 of the support 68. At least one retention pin 84 is moved in a direction D2 (FIGS. 3-4) and is inserted in the interface bore(s) 74B and support bore 78B and support bores 79B such that engagement of the retention pin 84 with surfaces of the bore(s) 74B, 78B, 79B establishes the installed position in which the seal arc segment 66 is carried by the retention pins 84. Thereafter, the support plate 86 is secured to the support 68 such that the retention pins 84 are trapped between the support plate 86 and support 68 in the installed position.

Continuing to refer to FIG. 5, during operation cooling flow CF is conveyed from each feeding passage 68P to the cooling cavity 96. A first fluid pressure is established in the cooling cavity 96, and a second fluid pressure is established between the support plate 86 and the leading edge portion 72L which may be greater than an adjacent region of the gas path GP. The first and second fluid pressures can be the same or can differ to establish a pressure differential between the feeding plenum 94 and cooling cavity 96 (and adjacent gas path GP).

A portion of the cooling flow CF is conveyed through each cooling passage 86P such that the portion of the cooling flow CF directly impinges on the leading edge portion 72L of the seal arc segment 66 such that a localized temperature of the leading edge portion 72L approaches a localized temperature of the intermediate portion 72I and/or trailing edge portion 72T. A portion of the cooling flow CF conveyed from each feeding passage 68P directly impinges on the intermediate portion 72I of the seal arc segment 66 such that the localized temperature of the intermediate portion 72I approaches a localized temperature of the trailing edge portion 72T and/or leading edge portion 72L. The portions of cooling flow CF conveyed along the localized regions LR1, LR2 can differ to provide distributed cooling augmentation along the sealing portion 72. In examples, a portion of cooling flow CF conveyed from each cooling passage 78P directly impinges on the trailing edge portion 72T of the seal arc segment 66 such that the localized temperature of the trailing edge portion 72T approaches a localized temperature of the intermediate portion 72I and/or leading edge portion 72L.

Figure 6:
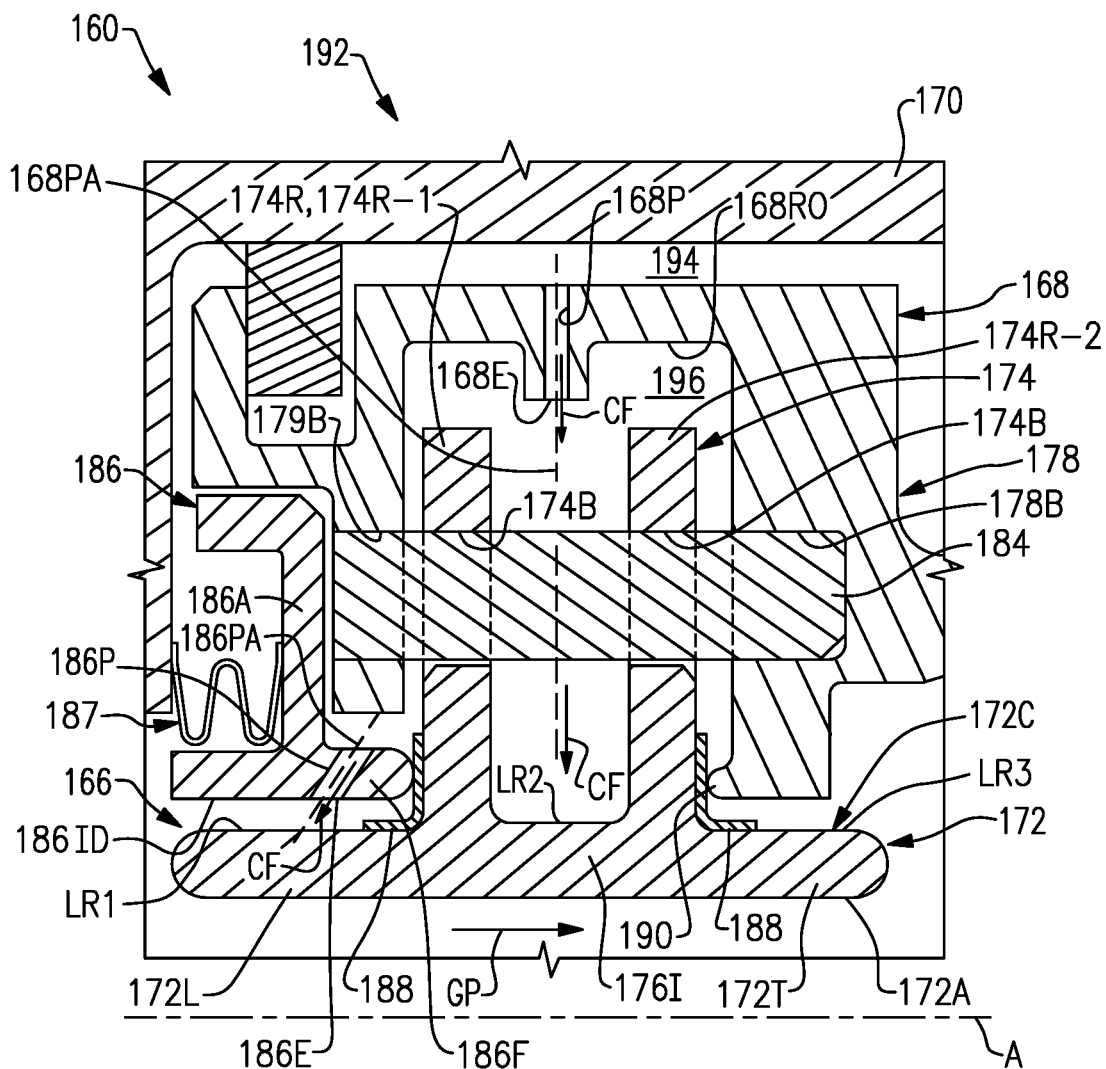
FIG. 6 illustrates a section view of a seal assembly according to an example.

FIG. 6 illustrates an assembly 160 for a gas turbine engine according to another example. In this disclosure, like reference numerals designate like elements where appropriate and reference numerals with the addition of one-hundred or multiples thereof designate modified elements that are understood to incorporate the same features and benefits of the corresponding original elements. The assembly 160 includes at least one seal arc segment 166, at least one support 168 and a support plate 186.

The assembly 160 establishes a cooling scheme 192 including a feeding plenum (or cavity) 194 and cooling cavity 196. A seal member 187 is captured between the engine case 170 and support plate 186 to bound a perimeter of the feeding plenum 194. The seal member 187 can incorporate various seal configurations. In the illustrative example of FIG. 6, the seal member 187 is a W-seal arranged to oppose flow along an axial gap between the engine case 170 and support plate 186.

The support 168 includes at least one face seal 190 dimensioned to engage the interface portion 174. The face seal 190 is dimensioned to oppose fluid flow along an axial gap between the interface portion 174 and a first interface portion 178 of the support 168. The face seal 190 is dimensioned to bound the cooling cavity 196 adjacent to a third localized region LR3 along a trailing edge portion 172T of the seal arc segment 166.

The support plate 186 includes a plate flange 186F extending outwardly from a plate body 186A. The plate flange 186F is dimensioned to extend along an inner diameter 186ID of the support plate 186.

The seal arc segment 166 can include one or more sacrificial members 188 disposed on surfaces of rails 174R of interface portion 174 and/or surfaces of a backside face 172C of the seal arc segment 166. The plate flange 186F is arranged to contact an adjacent sacrificial member 188 along the rail 174R-1 to bound a perimeter of the cooling cavity 196 adjacent to a first localized region LR1 along leading edge portion 172L. In other examples, the sacrificial member(s) 188 are omitted, and the face seal 190 and plate flange 186F directly abut against the respective rails 174R.

The sacrificial members 188 can be made of a material that differs from a material of the face seal 190 and/or plate flange 186F. The sacrificial members 188 can be machined or otherwise formed to have a complementary geometry with the respective rail 174R while preserving a construction of the underlying laminate structure of the seal arc segment 166. The sacrificial member 188 can be a coating or constructed from one or more sacrificial plies or layers, and is dimensioned to eliminate or otherwise reduce direct contact between surfaces of the face seal 190 and plate flange 186F and the respective rails 174R-1, 174R-2. An example coating includes a silicon metal that is adapted to substantially match a rate of thermal expansion of the seal arc segment 166 to reduce a likelihood of spalling of the laminate structure of the CMC layup.

The cooling scheme 192 includes one or more feeding and cooling passages 168P, 186P. Each feeding passage 168P is oriented such that a projection of passage axis 168PA intersects the second localized region LR2. Each cooling passage 186P is oriented such that a projection of passage axis 186PA intersects the first localized region LR1. The feeding and cooling passages 168P, 186P can be arranged to provide impingement cooling to adjacent portions of the seal arc segments 166.

The feeding and cooling passages 168P, 186P can be arranged at various radial distances or heights relative to the backside face 172C of the seal arc segment 166. In examples, a distance between the exit ports 186E and the backside face 172C is less than or equal to 25% of a distance between the exit ports 168E and the backside face 172C relative to the longitudinal axis A, or more narrowly less than or equal to 10%. For example, the support 168 can be dimensioned such that an exit port 168E of the feeding passage 168P is defined radially inwardly of a radially outward surface 168RO of the support 168 bounding the cooling cavity 196, as illustrated in FIG. 6. The arrangement can reduce a radial distance between the exit port 168E and surfaces of the second localized region LR2 relative to a longitudinal axis A to reduce diffusion of the cooling flow CF in the cooling cavity 196 and increase localized cooling augmentation.

Figure 7:
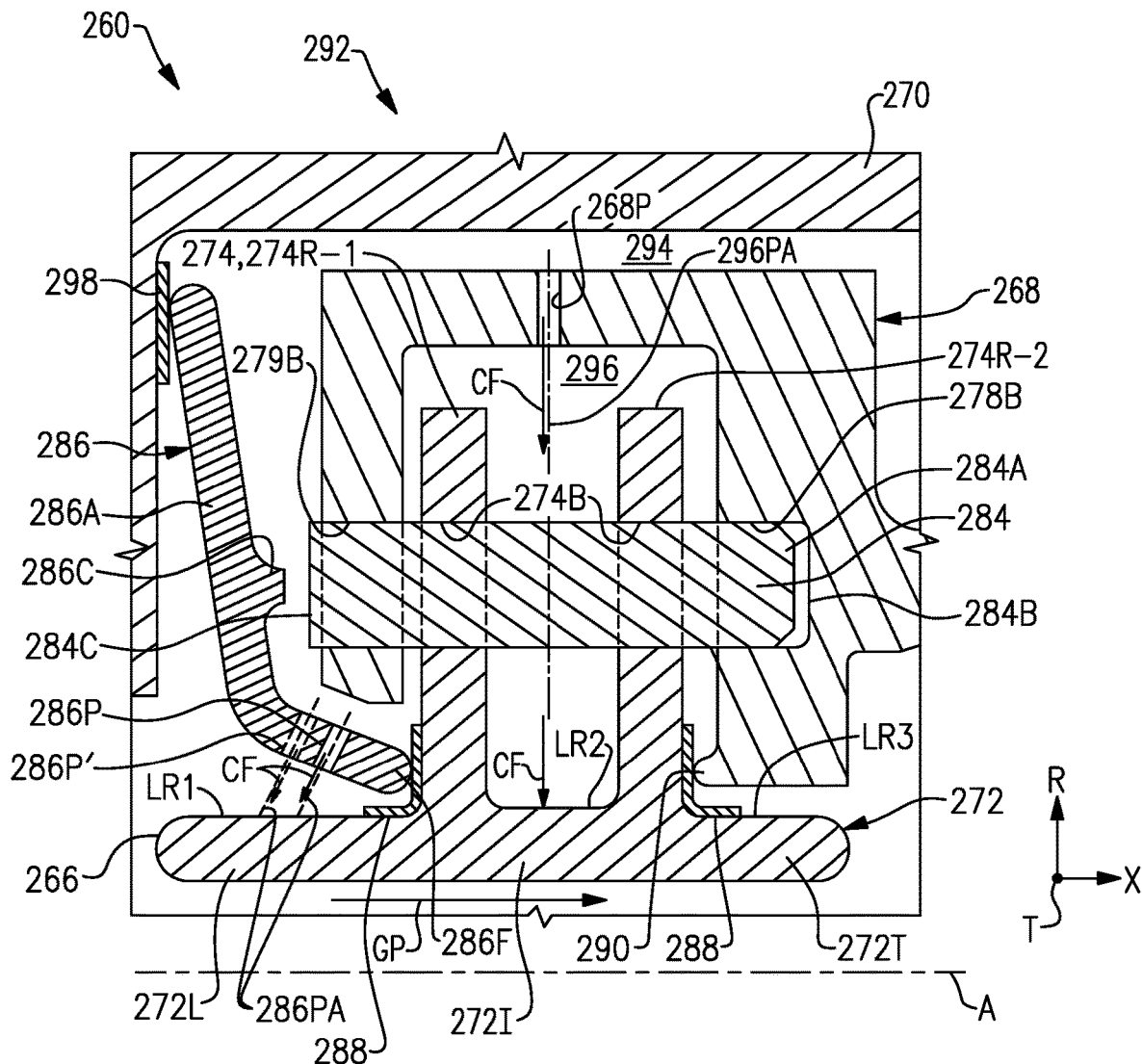
FIG. 7 illustrates a section view of a seal assembly according to another example.

FIG. 7 illustrates an assembly 260 for a gas turbine engine according to another example. The assembly 260 includes at least one seal arc segment 266, support 268 and support plate 286. The assembly 260 establishes a cooling scheme 292 including a feeding plenum (or cavity) 294 and cooling cavity 296.

The support plate 286 may generally be referred to as a "dog bone seal" and includes a plate body 286A and a plate flange 286F extending transversely from the plate body 286A. The plate body 286A is arranged to abut an engine case 270 directly or along a sacrificial member 298 which can be constructed according to any of the techniques disclosed herein. The support plate 286 is arranged such that a major component of the plate body 286A and a minor component of the plate flange 286F extend in a radial direction and such that a minor component of the plate body 286A and a major component of the plate flange 286F extend in an axial direction relative to the longitudinal axis A.

The support plate 286 includes a stop member 286C extending outwardly from the plate body 286A. The stop member 286C is radially aligned with a second end portion 284C of retention pin 284 to limit axial movement of the retention pin 284 relative to the longitudinal axis A.

The support plate 286 includes at least one cooling passage 286P extending through a thickness of the plate flange 286F. The support plate 286 can include at least one cooling passage 286P' circumferentially aligned with the cooling passage 286P (shown in dashed lines for illustrative purposes). The cooling passages 286P, 286P' are arranged at different positions and/or orientations to intersect different axial positions along a leading edge portion 272L of the seal arc segment 266 to provide targeted cooling augmentation.

Figure 8:
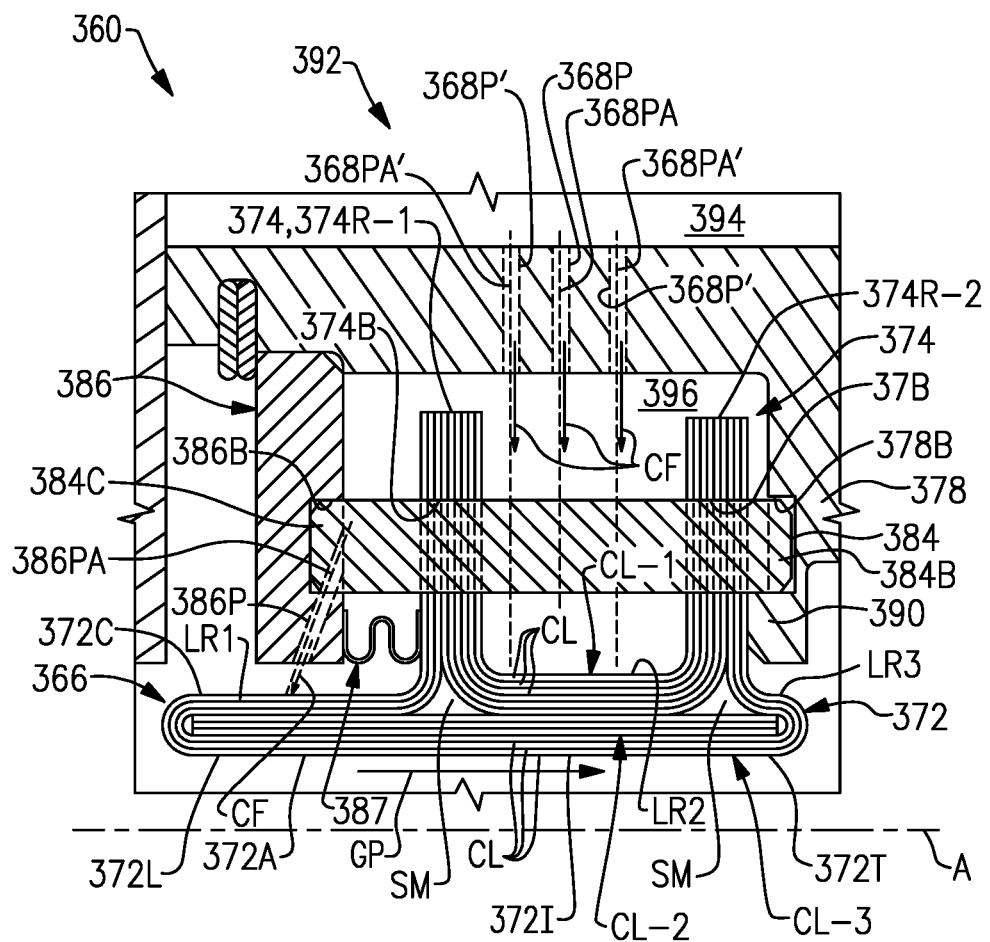
FIG. 8 illustrates a section view of a seal assembly according to yet another example.

FIG. 8 illustrates an assembly 360 for a gas turbine engine according to another example. The assembly 360 includes at least one seal arc segment 366, at least one support 368 and a support plate 386.

The seal arc segment 366 can be made of high temperature materials including any of the materials disclosed herein. In the illustrative example of FIG. 8, the seal arc segment 366 is made of a CMC material including a plurality of layers CL in stacked relationship to establish a laminate structure of a CMC layup. Each layer CL can incorporate various fiber arrangements and materials.

Various constructions can be utilized to establish the CMC layup. In the illustrative example of FIG. 8, each seal arc segment 366 includes first, second and third sets of layers CL (indicated at CL-1 to CL-3) that cooperate to establish a sealing portion 372 and interface portion 374 of the seal arc segment 366. The first set of layers CL-1 establish the rails 374R and intermediate portion 3721 along a second localized region LR2. The second set of layers CL-2 establish an internal core of the sealing portion 372. The third set of layers CL-3 extend along the first and second sets of layers CL-1, CL-2 to establish the rails 374R and the faces 372A, 372C of the sealing portion 372. The CMC layup can include one or more fillers or stiffening members SM arranged between the sets of layers CL-1, CL-2 and/or CL-3. The stiffening members SM can include various materials such as chopped fibers in a resin matrix, for example.

The support plate 386 can include one or more plate bores 386B (one shown for illustrative purposes) dimensioned to at least partially receive a second end portion 384C of a respective retention pin 384. In an installed position, each interface bore 374B is partially or completely radially aligned with an adjacent support bore 378B and/or plate bore 386B. Each retention pin 384 is slidably received in, and extends at least partially through, the interface bore 374B of each rail 374R-1, 374R-2. The first end portion 384B of the retention pin 384 is at least partially received or inserted into the respective support bore 378B, and the second end portion 384C of the retention pin 384 is at least partially received or inserted into the respective plate bore 386B to secure the first interface portion 374 of the seal arc segment 366 to the support 368. Various techniques can be utilized to secure the retention pin 384 to the support 368 and/or support plate 386, such as press fitting or threadedly attaching the retention pin 384 in the support bore 378B and/or plate bore 386B.

The assembly 360 establishes a cooling scheme 392 including a feeding plenum (or cavity) 394 and cooling cavity 396. The support plate 386 can include at least one cooling passage 386P (shown in dashed lines for illustrative purposes) circumferentially offset from adjacent plate bore(s) 386B. The support 368 can include one or more feeding passages 368P' (shown in dashed lines for illustrative purposes) circumferentially aligned with feeding passage 368P. The feeding passages 368P, 368P' can be arranged at different positions and/or orientations to intersect different axial positions along an intermediate portion 372I of the seal arc segment 366 relative to the longitudinal axis A.

The disclosed distributed cooling schemes can reduce thermal gradients across the seal arc segment, which may otherwise occur due to communication of hot gases at different temperatures across the sealing face of the seal arc segment relative to a general direction of flow in the adjacent gas path. A reduction of thermal gradients in the seal arc segments can reduce stress concentrations and improve durability.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
a seal arc segment including a sealing portion and a pair of opposed rails extending outwardly from the sealing portion, the sealing portion including a sealing face dimensioned to bound a core flow path and including a backside face opposed to the sealing face, and the backside face including a first localized region, a second localized region between the pair of rails, and a third localized region;
a support including a mounting portion and a first interface portion, the mounting portion attachable to an engine static structure;
at least one retention pin dimensioned to engage the first interface portion of the support and at least one of the pair of rails such that the seal arc segment is carried by the at least one retention pin; and
a support plate arranged relative to the support such that the at least one retention pin is trapped between the support plate and the support;
wherein a cooling cavity is established between the support, the support plate, and the second localized region; and
wherein the support plate defines at least one cooling passage coupled to the cooling cavity, the at least one cooling passage extending along a first passage axis, and a projection of the first passage axis intersecting the first localized region.

2. The assembly as recited in claim 1, wherein the seal arc segment comprises a ceramic material.

3. The assembly as recited in claim 1, wherein the support includes at least one feeding passage interconnecting the cooling cavity and a fluid source.

4. The assembly as recited in claim 3, wherein the at least one feeding passage extends along a second passage axis, and a projection of the second passage axis intersects the second localized region.

5. The assembly as recited in claim 4, wherein the at least one cooling passage is arranged such that cooling flow directly impinges on the first localized region in operation, and the at least one feeding passage is arranged such that cooling flow directly impinges on the second localized region in operation.

6. The assembly as recited in claim 5, wherein the seal arc segment is arranged about a longitudinal axis, and an exit port of the at least one cooling passage is radially inward of an exit port of the at least one feeding passage relative to the longitudinal axis.

7. The assembly as recited in claim 6, wherein the at least one cooling passage is dimensioned such that the first passage axis slopes inwardly in a direction away from the pair of rails relative to the longitudinal axis.

8. The assembly as recited in claim 1, wherein each of the pair of rails includes at least one interface bore dimensioned to receive the at least one retention pin such that the seal arc segment sits on an outer periphery of the at least one retention pin.

9. The assembly as recited in claim 1, further comprising a seal member captured between the support plate and one of the pair of rails to bound the cooling cavity.

10. The assembly as recited in claim 1, wherein the support includes a second interface portion opposed to the first interface portion, the second interface portion is situated between the support plate and the first interface portion, and the at least one retention pin is dimensioned to span between the first and second interface portions.

11. The assembly as recited in claim 1, wherein:
the sealing portion and the pair of rails comprise a ceramic material;
the seal arc segment is arranged about a longitudinal axis;
the sealing portion includes a leading edge portion, a trailing edge portion, and an intermediate portion between the leading and trailing edge portions relative to the longitudinal axis;
the pair of rails includes a first rail and a second rail, the first and second rails extending circumferentially between opposed mate faces of the seal arc segment to divide the backside face into the first localized region along the leading edge portion, the second localized region between the first and second rails, and the third localized region;

the support plate is releasably attached to the support;
a seal member is captured between the support plate and the first rail;
the first interface portion of the support is dimensioned to abut the second rail to bound the cooling cavity;
the support includes at least one feeding passage interconnecting the cooling cavity and a fluid source, the at least one feeding passage extends along a second passage axis, a projection of the second passage axis intersects the second localized region, and an exit port of the at least one cooling passage is radially inward of an exit port of the at least one feeding passage relative to the longitudinal axis.

12. The assembly as recited in claim 11, wherein the first interface portion is free of any cooling passages coupled to the cooling cavity such that the third localized region is fluidly isolated from the cooling cavity.

13. A gas turbine engine comprising:
an engine case extending along an engine longitudinal axis;
an array of blades rotatable about the engine longitudinal axis; and
a seal assembly comprising:
an array of blade outer air seals (BOAS) arranged about the array of blades, each of the BOAS including a sealing portion and a pair of rails extending outwardly from the sealing portion, and the sealing portion including a leading edge portion, a trailing edge portion, and an intermediate portion between the pair of rails;
at least one support attached to the engine case;
a plurality of retention pins dimensioned to engage the at least one support and the pair of rails of a respective one of the BOAS such that the BOAS are carried by the retention pins;
a support plate positioned relative to the support such that the support plate limits movement of the plurality of retention pins relative to the engine longitudinal axis;
wherein a cooling cavity is established between the at least one support, the intermediate portion, and the support plate; and
wherein the support plate defines at least one cooling passage coupled to the cooling cavity, and the at least one cooling passage is oriented to convey fluid from the cooling cavity in a direction towards the leading edge portion.

14. The gas turbine engine as recited in claim 13, wherein at least the sealing portion of each of the BOAS comprises a ceramic material.

15. The gas turbine engine as recited in claim 14, wherein the at least one support includes at least one feeding passage interconnecting the cooling cavity and a coolant source, the at least one feeding passage is arranged to eject cooling flow from the coolant source such that a portion of the cooling flow directly impinges on the intermediate portion in operation, and the support plate is arranged such that another portion of the cooling flow conveyed by the at least one cooling passage directly impinges on the leading edge portion in operation.

16. The gas turbine engine as recited in claim 15, further comprising a seal member captured between the support plate and one of the pair of rails to bound the cooling cavity adjacent the leading edge portion.

17. A method of sealing for a gas turbine engine comprising:
positioning a seal arc segment relative to a support, wherein the seal arc segment includes a sealing portion and a pair of opposed rails extending outwardly from the sealing portion, the sealing portion includes a sealing face dimensioned to bound a core flow path and includes a backside face opposed to the sealing face, wherein the sealing portion includes a leading edge portion, a trailing edge portion, and an intermediate portion between the pair of rails, and wherein the support includes a mounting portion and a first interface portion, the mounting portion attachable to an engine static structure;
moving at least one retention pin into engagement with the first interface portion of the support and with at least one of the pair of rails such that the seal arc segment is carried by the at least one retention pin;
trapping the at least one retention pin between the support and a support plate;
conveying cooling flow from at least one feeding passage to a cooling cavity, wherein the cooling cavity is established between the support, the support plate and the backside face of the seal arc segment along the intermediate portion; and
conveying a portion of the cooling flow through at least one cooling passage extending through the support plate such that the portion of the cooling flow directly impinges on the leading edge portion of the seal arc segment and a localized temperature of the leading edge portion approaches a localized temperature of the intermediate portion.

18. The method as recited in claim 17, wherein the seal arc segment comprises a ceramic material.

19. The method as recited in claim 18, wherein the step of conveying the cooling flow from the at least one feeding passage occurs such that another portion of the cooling flow directly impinges on the intermediate portion of the seal arc segment and the localized temperature of the intermediate portion approaches a localized temperature of the trailing edge portion.

20. The method as recited in claim 19, wherein the conveying steps occur such that a first fluid pressure is established in the cooling cavity and such that a second fluid pressure is established between the support plate and the leading edge portion, the first fluid pressure being greater than the second fluid pressure.

* * * * *